(12) United States Patent
Chen (10) Patent No.: US 11,458,398 B2
(45) Date of Patent: Oct. 4, 2022

(54) TRAMPOLINE VIDEO GAME

(71) Applicant: Samuel Chen, Causeway Bay (CN)

(72) Inventor: Samuel Chen, Causeway Bay (CN)

( * ) Notice: Subject to any disclaimer, the term of this patent is extended or adjusted under 35 U.S.C. 154(b) by 0 days.

(21) Appl. No.: 17/323,972

(22) Filed: May 18, 2021

(65) Prior Publication Data

US 2022/0134233 A1 May 5, 2022

Related U.S. Application Data

(60) Provisional application No. 63/026,882, filed on May 19, 2020.

(51) Int. Cl.
| | | |
|---|---|---|
| *A63F 13/655* | (2014.01) | |
| *A63F 13/2145* | (2014.01) | |
| *A63F 13/33* | (2014.01) | |
| *A63F 13/537* | (2014.01) | |
| *A63B 5/11* | (2006.01) | |
| *A63B 24/00* | (2006.01) | |

(52) U.S. Cl.
CPC .............. *A63F 13/655* (2014.09); *A63B 5/11* (2013.01); *A63B 24/0062* (2013.01); *A63F 13/2145* (2014.09); *A63F 13/33* (2014.09); *A63F 13/537* (2014.09); *A63B 2024/0096* (2013.01); *A63B 2220/05* (2013.01); *A63B 2220/806* (2013.01); *A63B 2225/50* (2013.01); *A63F 2300/1075* (2013.01); *A63F 2300/303* (2013.01); *A63F 2300/695* (2013.01)

(58) Field of Classification Search
CPC .... A63F 13/655; A63F 13/2145; A63F 13/33; A63F 13/537; A63F 2300/1075; A63F 2300/303; A63F 2300/695; A63B 5/11; A63B 24/0062; A63B 2220/05; A63B 2220/806; A63B 2225/50
See application file for complete search history.

(56) References Cited

U.S. PATENT DOCUMENTS

| | | |
|---|---|---|
| 8,206,266 B2 | 6/2012 | Hall |
| 10,518,132 B2 | 10/2019 | Dalley |
| (Continued) | | |

FOREIGN PATENT DOCUMENTS

| | | |
|---|---|---|
| KR | 20180112656 | 10/2018 |
| KR | 101974911 | 5/2019 |
| (Continued) | | |

*Primary Examiner* — Steve Rowland
(74) *Attorney, Agent, or Firm* — Clement Cheng (57) ABSTRACT

A trampoline video game has a trampoline having a bed suspended across a trampoline frame. The bed has a bed center, bed middle, and bed periphery. A beam emitter is configured for operation by a first player to emit a beam. A player one target includes a sensor and a camera. The player one target is connected to a wide area network. A processor is electrically connected to the camera. The processor is configured to generate a geometric model from an image or a video of the first player. A second player terminal is configured as a wireless device with a touchscreen. The second player terminal is configured to connect to the wide area network. A first player avatar is generated on the touchscreen. The first player avatar is generated from the geometric model. Players are given incentives for jumping in the bed middle.

19 Claims, 5 Drawing Sheets

(56) References Cited

U.S. PATENT DOCUMENTS

| | | | |
|---|---|---|---|
| 2005/0043122 A1* | 2/2005 | Publicover | A63B 71/06 473/465 |
| 2008/0115121 A1* | 5/2008 | Douceur | A63F 13/34 706/45 |
| 2009/0111670 A1 | 4/2009 | Williams | |
| 2011/0034300 A1* | 2/2011 | Hall | A63B 24/0003 482/29 |
| 2012/0142500 A1* | 6/2012 | Ronan | A63B 5/11 482/29 |
| 2012/0295763 A1 | 11/2012 | Lin | |
| 2013/0072269 A1* | 3/2013 | Chen | A63B 63/00 463/7 |
| 2014/0038678 A1* | 2/2014 | Chen | A63B 69/0053 463/7 |
| 2015/0335930 A1* | 11/2015 | Dallmann | A63B 71/0622 473/465 |
| 2017/0128779 A1* | 5/2017 | Howe | A61B 5/744 |
| 2017/0144052 A1 | 5/2017 | Liang | |
| 2017/0340939 A1* | 11/2017 | Chen | A63B 67/10 |
| 2018/0133530 A1* | 5/2018 | Chen | A63F 9/0291 |
| 2018/0264321 A1 | 9/2018 | Nir et al. | |
| 2018/0311531 A1* | 11/2018 | Dalley | A63B 5/11 |
| 2022/0134233 A1* | 5/2022 | Chen | A63B 5/11 463/36 |
| 2022/0215224 A1* | 7/2022 | Sareen | G06T 19/00 |

FOREIGN PATENT DOCUMENTS

| | | | |
|---|---|---|---|
| KR | 101974911 B1 * | 5/2019 | |
| RU | 2682014 C1 | 3/2019 | |
| WO | 201918040 | 1/2019 | |

* cited by examiner

TRAMPOLINE VIDEO GAME

This application claims priority from U.S. provisional application 63/026,882 entitled Trampoline Video Game filed May 19, 2020 by same inventor Samuel Chen, the disclosure of which is incorporated herein by reference.

FIELD OF THE INVENTION

The present invention is in the field of a video game played on a trampoline, more specifically, a trampoline video game.

BACKGROUND

A variety of different exercise systems incorporate a trampoline with a virtual video game to provide a virtual reality, or an augmented reality game experience for a trampoline user.

For example, in the U.S. patent Ser. No. 10/518,132, Trampoline for Use as an Input Device for an electronic game by inventor Edward Noel Dalley, published Oct. 31, 2019 the abstract discloses, "A trampoline as a controller or an input device for playing games, comprising a frame having a flexible mat divided into input zones and one or more neutral zones, a sensor arrangement to detect activity on V the flexible mat, a controller configured to determine the bounce location and bounce zone of the activity and provide this information to a feedback generator for playing games on the trampoline, such that a user uses the trampoline to play games by jumping on the input and neutral zones."

For example, in U.S. Pat. No. 8,206,266B2, entitled Sensor, Control and Virtual Reality System for a trampoline by inventor David Hall, published Jun. 26, 2012 the abstract discloses, "A trampoline exercise system that is designed to show an avatar of a user, which is jumping on a trampoline. The exercise system includes a computer module, a trampoline configured to provide a platform for a user to perform exercises thereon, and a sensor module designed to sense movements of a user performed on the trampoline. The sensor module provides information that is received by the computer module that controls the display of a users' avatar on a video monitor in response to the users' motion on the trampoline. Several types of sensor may be used to sense the movement of the user, including body mounted sensors, trampoline mounted sensors, and remote viewing sensors."

For example, in the United States publication number US20090111670A1, entitled Walk Simulation Apparatus for Exercise and Virtual Reality by inventor Julian D. Williams, published Apr. 30, 2009 the abstract discloses, "A locomotion platform device enables a user to perform a simulation of various motions including walking and running. The device comprises a locomotion platform having a concave upward facing surface. The platform and/or the user's footwear incorporate a mechanism to reduce friction between the user and the surface of the platform in order to allow the user's feet to move freely."

For example, in the United States publication number US20120295763A1, Trampoline With Feedback System by inventor Tseng Hsiang Lin, published Nov. 22, 2012 the abstract discloses, "A trampoline includes a frame and a jumping mat assembly that is supported by the frame to allow at least one user to bounce thereon. The trampoline also includes a sensor system that includes a plurality of sensors that are supported by the frame and/or the jumping mat assembly. The plurality of sensors are spaced apart from each other. At least two of the plurality of sensors generate a respective signal due to the user impacting the jumping mat assembly. The trampoline further includes a feedback system that provides a feedback signal and a controller that compares the respective signals from the sensors to determine a status of user. The controller is operable to cause the feedback system to provide the feedback signal according to the determined status of the user."

For example, in the United States publication number US20170144052A1, Automated Systems and Methods for A Smart Trampoline Jumping Mat by inventor Yi Liang, published May 25, 2017 the abstract discloses, "A smart trampoline jumping mat system is designed that has a jumping mat, a sensor or a set of sensors, a processor with wireless communication unit, and a handheld device with an application program running from the smart handheld device. The sensor or set of sensors can be used for sensing activity of a person or an object on the bounce members. The processor is used to acquire deflection data from the sensor or sensor group. Deflection data is then manipulated by the processor prior to being sent to the handheld device. The handheld device may include a processor, graphical user interfaces (GUI) to show the move meat of the juniper, and a speaker to generate audible feedback. A method to compute the height of a bounce is also presented. The deflection value is combined with data based on jumper's weight, jump period, and size of trampoline mat to determine the height of a bounce."

For example, in United States publication number US20180264321A1, Tilting Surface Application Controller by inventor Gadi Nir, published Sep. 20, 2018 the abstract discloses, "The present invention relates to an electronic device configured to be fixed to a standing surface; wherein said electronic device comprises: a processor; a sensor, wherein said sensor is selected from one of the following sensors: a. an accelerometer sensor configured to estimate the acceleration of said standing surface and provide acceleration data; and wherein said processor is configured to receive said acceleration data from said accelerometer sensor and convert said accelerometer data into corresponding generic key stroke commands of a standard keyboard; b. a gyroscope sensor configured to estimate angular data of said standing surface and provide angular data; and wherein said processor is configured to receive said angular data from said gyroscope sensor and convert said angular data into corresponding generic key stroke commands of a standard keyboard; a transmitter configured to transmit said generic key stroke commands to a remote device; and a power source."

For example, in the International patent number KR101974911B1, Augmented reality based sports game system using trampoline by inventor Changhoon Lee, published May 3, 2019 the abstract discloses, "The present invention relates to an augmented reality-based sports game system using a trampoline, and more particularly, to a trampoline game system that enables a user to jump; An output unit for outputting an augmented reality including an image of a user using the trampoline and sports game contents; And a control unit for controlling a sports game content output to the output unit using a jump operation of a user using the trampoline, wherein the control unit includes a motion detection module for detecting a jump operation of a user using the trampoline through a camera module; An operation data extracting module for extracting three-dimensional user operation data from the jump operation of the user sensed by the operation sensing module; And a sports game control module for controlling the sports game content output through the output unit and controlling the sports game content using the user operation data extracted by the operation data extraction module.

According to the augmented reality-based sports game system using the trampoline proposed in the present invention, by controlling the sports game contents by the jump operation of the user using the trampoline, the user continuously jumps for the play of the sports game, And provides an augmented reality that includes an image of the user using the trampoline, allowing the user to identify his or her own playing in the sport game, to make the jump motion more accurate and to provide additional fun. According to the augmented reality-based sports game system using the trampoline proposed in the present invention, the wearable device that is worn on the body of the user and collects body measurement data is further included to analyze the exercise amount of the user playing the sports game And can control the sports game content using the results of the analysis of the body measurement data to adjust the user to exercise appropriately."

For example, in Korean publication number KR20180112656A, Interactive Trampoline Play System and Control Method for the Same by inventor Jiho Kim, published Oct. 12, 2018 the abstract discloses, "The present invention provides image contents for a character corresponding to each player playing on a trampoline and detects motion of each player when one or more players make jumps or the like using the trampoline. And the present invention controls operation of the character corresponding to each player based on sensed information. Thus, interest in playing with the trampoline greatly improves through provision of interactive contents for motion of each player."

For example, in Russian patent number RU2682014C1, Virtual Reality System by inventor Dmitry Sergeevich Shangin, published Mar. 14, 2019 the abstract discloses, "The invention relates to computer systems, in particular, to virtual reality systems, and is intended, in particular, for creation of game simulators. Technical result is achieved by a virtual reality system for a trampoline, comprising a video camera, imaging means, portable element is made in the form of a mark with size of 200×200 mm of a fluorescent color, and a data processing device configured to: obtain information from the video camera, recognizing the fluorescent color of a wearable element and outputting to the imaging means, wherein the system is configured to be calibrated before use, wherein the calibration includes identifying a player, arranged at distance of 2-3 m from the video camera, by a fluorescent wearable element, and determination of perimeter of a trampoline hopper and lower vertical boundary of jump, which is established depending on the level of preparedness of players."

For example, in the International publication number WO2019180940A1, entitled Trampoline Scoring Assistance Device, Trampoline Scoring Assistance Method, And Trampoline Scoring Assistance Program by inventor Gangtian et al., published Sep. 26, 2019 the abstract discloses, "The purpose of the present invention is to improve the accuracy of calculation of landing position upon landing of a contestant in a bed portion during a trampoline competition. This trampoline scoring assistance device is characterized by comprising: a position calculation unit which calculates, on the basis of a measurement result obtained by means of a sensor disposed under the bed portion of a trampoline, the center position of a dent region created in the bed portion; and a determination unit which switches, depending on a position according to the measurement result, a determination method for determining the landing position of a contestant in the bed portion during a trampoline competition on the basis of the center position of the dent region, and determines the landing position according to the determination method after the switching."

The above prior art references are incorporated herein by reference.

SUMMARY OF THE INVENTION

An object of the present invention is to allow a first player playing on a physical trampoline to play a competitive game against a second player playing electronically and without a trampoline on a wireless device.

A trampoline video game has a trampoline having a bed suspended across a trampoline frame. The bed has a bed center, a bed middle, and a bed periphery. A beam emitter is configured for operation by a first player. The beam emitter is configured to emit a beam. A player one target includes a sensor and a camera. The player one target is connected to a wide area network. A processor is electrically connected to the camera. The processor is configured to generate a geometric model from an image or a video of the first player. A second player terminal is configured as a wireless device with a touchscreen. The second player terminal is configured to connect to the wide area network. A first player avatar is generated on the touchscreen. The first player avatar is generated from the geometric model.

A hitbox can be defined on the first player avatar. The touchscreen is configured to score hits on the first player avatar during play. A first player hit point bar and a second player hit point bar can be defined in the virtual coordinate space. A coordinate space has a coordinate definition on the wireless device and displayed on the touchscreen. The coordinate definition includes an X axis, a Y axis, and a Z-axis. Instead of direct tapping to score a hit, a projectile can be defined in the coordinate space. The hit box is preferably defined in the coordinate definition so that the hit box has a hit box X coordinate centroid, a hit box Y coordinate centroid, and a hit box Z coordinate centroid.

The processor is preferably configured to provide a first player starting hit point amount which is a first player's hit points when starting the game. The first player loses hit points when the second player scores a hit on the first player. The processor is configured to decay the first players hit points if the first player bounces away from the bed middle to the bed periphery by a hit point decay measured in units of hit points per bounce. The processor is configured to have a first player hit point recovery that recovers the hit points decayed which is also measured in units of hit points per bounce. The processor is configured to have regenerated hit points restored from damage scored by the second player when the first player bounces on the bed middle.

The player one target is mounted on a trampoline pole above the bed middle. The camera is downwardly facing at an angle. The bed middle is defined as a circular region on the trampoline. The bed periphery can be defined as a ring shaped region around the bed middle.

The following call out list of elements can be a useful guide in referencing the elements of the drawings.
20 Trampoline
21 Trampoline Legs
22 Spring Cover
23 Bed Periphery
24 Bed Middle
25 Player 1, First Player
26 Beam Emitter
27 Frame
28 Bed Center
29 Enclosure
30 Player One Target
31 Sensor
32 Camera
33 Processor
34 First Transceiver
35 Wireless Signal
36 Second Transceiver
37 Router 1
38 Wide Area Network
39 Router 2
40 Player 2 Terminal
41 Wireless Device
42 Touchscreen
43 Wireless Transceiver
51 Player 1 Avatar
52 Player 1 Hit Point Indicator
53 Player 2 Hit Point Indicator
54 Projectile Hit Box
55 Projectile First Position
56 Projectile Second Position
57 Projectile Third Position
58 Projectile Path
60 Coordinate Definition
61 X Axis
62 Y Axis
63 Z Axis
64 Hit Box X-Coordinate Centroid
65 Hit Box Y-Coordinate Centroid
66 Hit Box Z Coordinate Centroid
67 Reticle
68 Projectile
69 Ammunition Bar
70 Application
71 Speaker
72 starting hit point indicator
73 first player decay indicator
74 second player decay indicator
75 first player damage indicator
76 second player damage indicator
77 first player hit point bar
78 second player hit point bar

DETAILED DESCRIPTION OF THE PREFERRED EMBODIMENT

Figure 1:
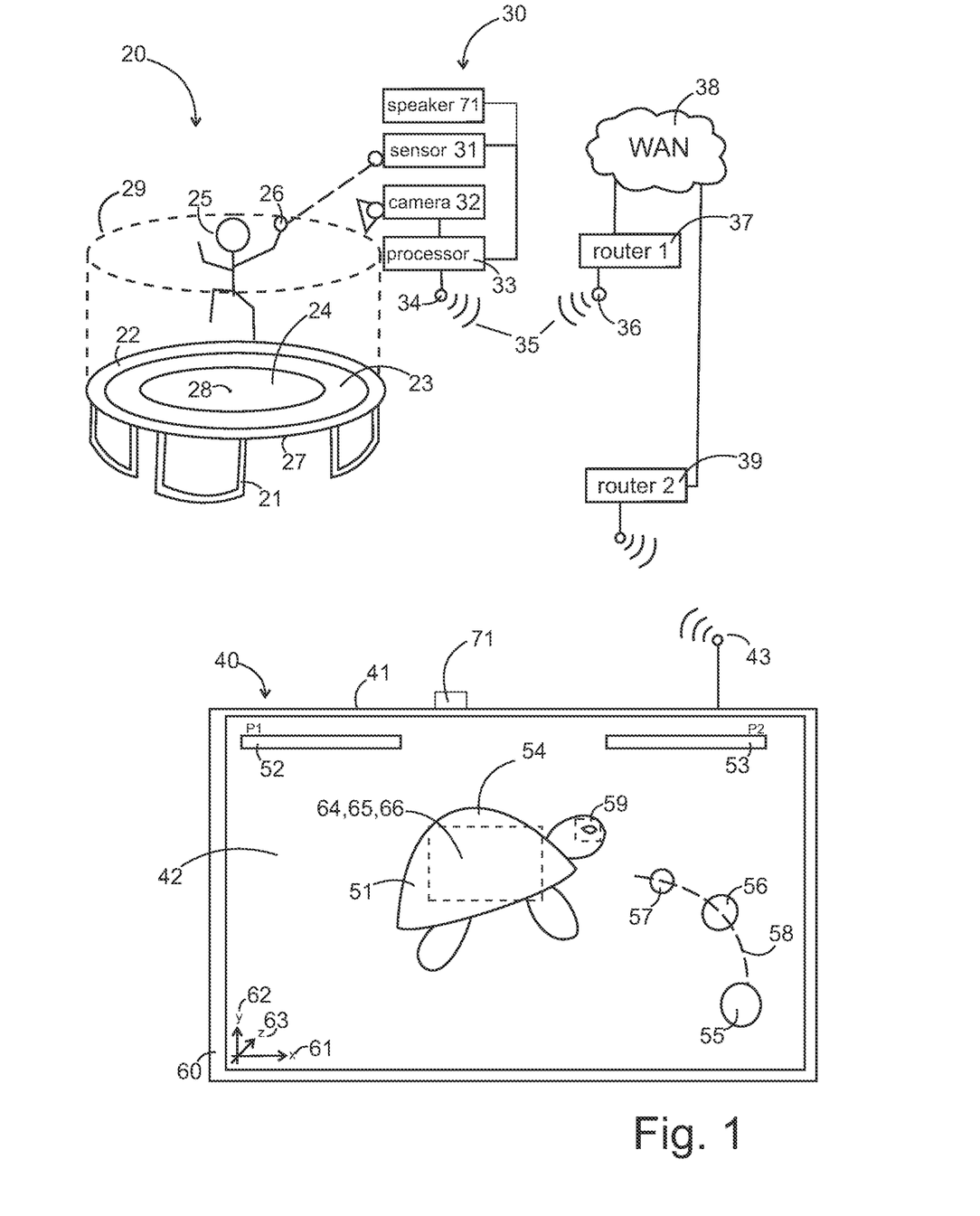
FIG. 1 is a simplified diagram of the operation of the trampoline video game.

As seen in FIG. 1, the present invention is played on a trampoline 20 which has a frame 27 supporting a trampoline bed. The frame 27 is connected to and supported by trampoline legs 21. The trampoline bed has a bed center 28, a bed middle 24, and a bed periphery 23. The spring cover 22 covers the springs around the periphery of the frame 27. A safety enclosure 29 connects to the frame 27.

The first player 25 has a beam emitter 26 that can shoot a beam that can be received at a first player target 30. The first player target 30 has a sensor 31, a camera 32, and a processor 33. The processor 33 is connected to a first transceiver 34. The camera 32 he pointed at the trampoline bed center 28 and can determine the location of the first player 25. When the first player is jumping on the bed center 28, the bed middle 24, or the bed periphery 23, the processor provides a status of the first player.

The processor communicates wirelessly from a first transceiver 34. The first transceiver 34 send a wireless signal 35 to a second transceiver 36 that connects to a first router 37. The first router 37 then connects to a wide area network 38 and through the wide area network communicates with a second router 39. The second router 39 communicates with a wireless transceiver means 43 on a second player terminal 40.

The second player terminal 40 is a wireless device 41 that has a touchscreen 42. The touchscreen displays a field having coordinate definition 60 on a coordinate space. The coordinate definition defines metes and bounds of the coordinate space to define a virtual play area. The coordinate definition includes an X axis 61, a Y axis 62, and a Z axis 63. The processor 33 translates the camera image taken from the camera 32 and outputs first player data so that the second player terminal 40 can generate a first player avatar 51.

The first player avatar 51, shown as a turtle, can be targeted by the second player that can send a projectile at the first player avatar 51. The projectile can have a projectile path 58 so that the projectile moves from a projectile first position 55, to a projectile second position 56, to a projectile third position 57. The projectile has a projectile path to create that can connect with the projectile hit box 54.

The hit box 54 registers a hit on the first player avatar 51 that represents the first player 25, when the hit box 54 is hit by a projectile. The first player can have a first player hit point indicator 52 and the second player can have a second player hit point indicator 53.

The first player 25 can use the beam emitter 26 to target the sensor 31 of the first player target 50. The second player can use the touchscreen 42 to target the player one avatar 51 by launching a projectile at a player one avatar 51 hit box 54. The projectile hit box 54 may have a hit box x-coordinate centroid 64, a hit box y-coordinate centroid 65, and a hit box Z coordinate centroid 66. The player one avatar 51 may have a tap hit box 59 that intermittently activates to allow the second player to tap on the touchscreen 42 to hit the player one avatar 51. The tap attack may have a status change, or debuff, or directly decrease the number of hit points on the player one hit point indicator 52. The projectile hit box 54 may also have an intermittent activation which can be dependent upon the coordinate definition 60.

The first player 25 jumps on the bed middle 24 and the player one avatar 51 can move in a jumping motion as well. If the first player 25 is jumping in the bed middle 24, the hit box 54 or the tap hit box 59 can be minimized or intermittently deactivated, based upon the first player jumping skill.

The number of hit points deducted can also be proportional to and depend upon the location of the first player jumping. For example, the first player can jump in the bed middle 24, or on the bed periphery 23. The bed middle 24 can shield the trampoline player, also called the first player or player one. The shield effect of the bed middle 24 can be such that a successful tap attack may decrease a single hit point, and a successful projectile attack may decrease two hit points. If the shield effect is removed such as if the user jumps in the bed periphery area 23, then the hit point deduction for the first player would increase, such as by doubling for example.

The bed middle 24 has a bed center 28 which is the geographical and geometric center of the trampoline bed. The bed center 28 can be marked with an alignment code such as a QR code or other code that can determine an alignment of the camera 32. As noted in the prior art, multiple cameras can be used for improving the position determination and stance of the first player.

The first player 25 can change between a variety of different stances or poses, such as curling up in a ball, which could be translated to a tortoise like player one avatar 51 as retracting into its shell to eliminate the tap hit box 59. The first player 25 could also jump vertically, or twist to change the direction of the player one avatar 51. If the first player 25 is facing to the left, the avatar can be drawn as facing to the left, and if the first player 25 is facing to the right, the avatar can be drawn as facing to the right. If the first player turns from the left to the right, then the avatar can be animated as turning from the left to the right.

Each of the different players' stances in combination with the location of the bed jumping can affect the stance of the avatar. For example, the avatar may have a blocking stance that is activated by a first player assuming a blocking stance such as by folded arms. The camera 32 is preferably stereoscopic so that the location, distance and motion of player one can be more precisely determined, however it is also possible to operate the game based on a single camera. The bed periphery 23 preferably has a color contrast with the bed middle 24, and a machine-readable indicator acting as an alignment indicator such as a QR code could be placed on the bed center 28. The spring cover 22 can also be used for alignment of the camera field of vision so that the motion of the first player 25 can be accurately translated to motion of the player one avatar 51.

The stance of a player can be determined by the stereoscopic camera system that converts player video to a geometric model, which is then used for building and animating the player one avatar 51. A variety of different mathematical models can be used for implementing the avatar conversion. For example, as previously described in the reference KR20180112656A, Interactive Trampoline Play System And Control Method For The Same by inventor Jiho Kim, published Oct. 12, 2018 the disclosure at FIGS. 1-2 describe a stereoscopic video camera method for generating avatar representations of trampoline participants.

Figure 2:
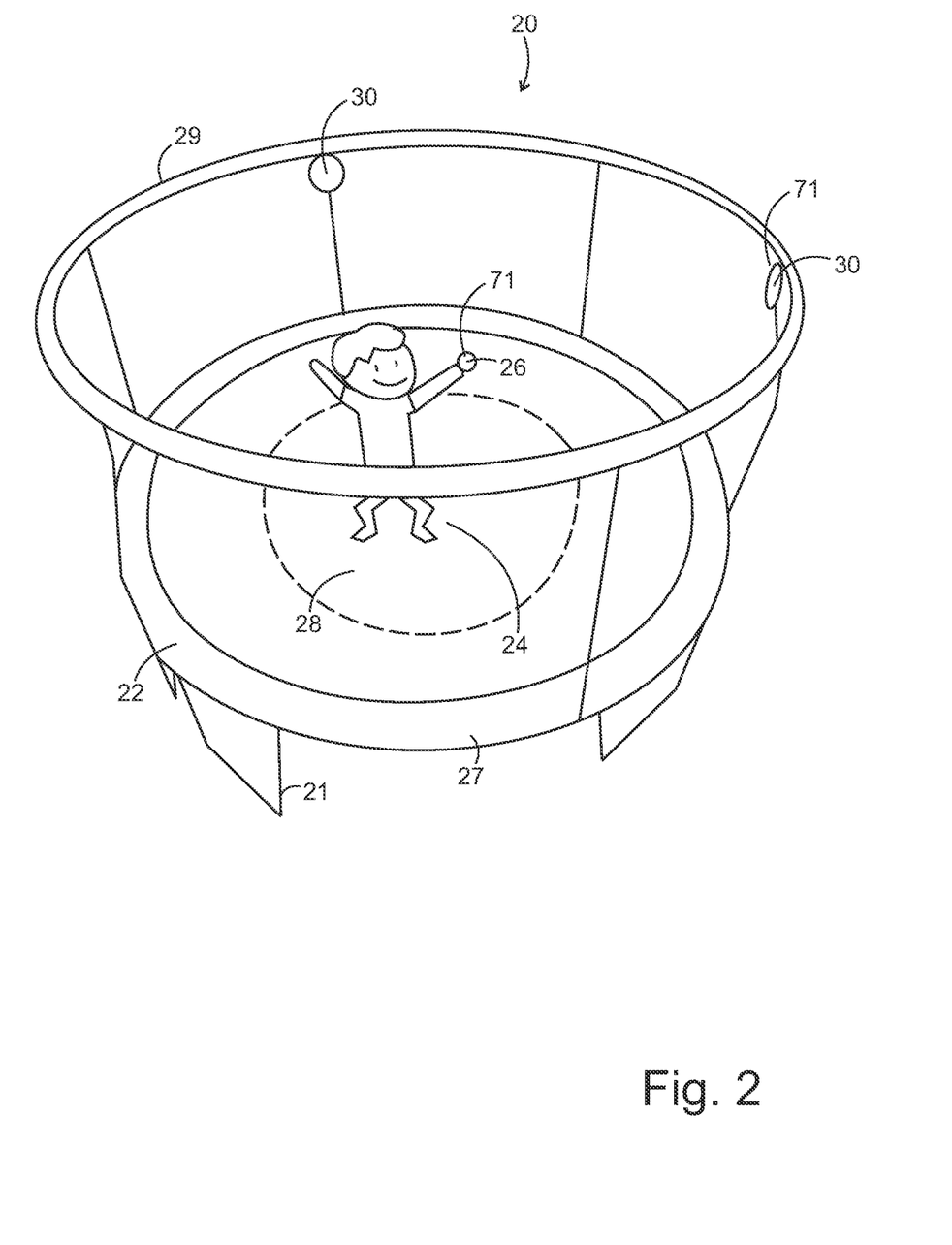
FIG. 2 is a diagram representing the physical space of the trampoline video game.

Additionally, as seen in FIG. 2, a user can hold a beam emitter 26 that is formed in the shape of a toroid disc. The beam emitter 26 has a beam emitter handle 45 with a beam emitter handle opening 46. As the first player shoots at the first player target in a physical space, the second player uses a touch screen to show at an avatar of the first player in virtual space. Thus, a key feature of the present invention is to bridge the physical play of the first player with the virtual play of the second player. The first player target represents the second player avatar, and the first player avatar represents the first player. As the users do not see each other, the users can be anonymous to each other. A first player can be a physical player with a trampoline can play with a second player that can be a virtual player, and additional players can be added as physical players or virtual players in a group game.

Figure 3:
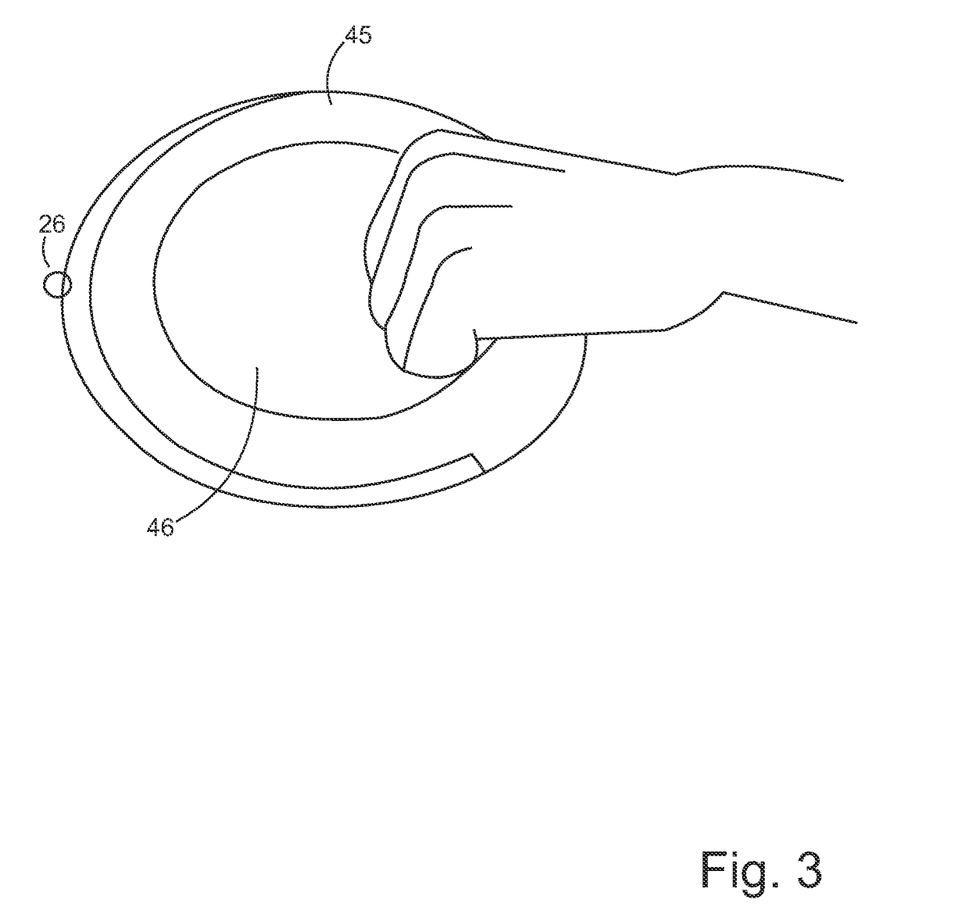
FIG. 3 is a potential beam emitter physical construction.

Additionally, as seen in FIG. 3, the player one avatar 51 can be a pterodactyl having a placement on the touchscreen. The touchscreen may further display an ammunition bar 69 to allow counting of ammunition usage consumed by the second player when launching projectiles toward the player one avatar 51. The projectiles 68 can be launched by the second player using the touchscreen graphical interface. The second player may also see a crosshairs or reticle 67 that marks where a projectile path begins, or terminates. The projectile 68 can be launched toward the first player avatar 51 according to the position of the reticle 67. The hit point bar can be a tug-of-war combined bar that combines the player one hit point indicator 52 with the player two hit point indicator 53 on a single bar so that when the first player scores a hit against the second player, the first player wins points and the second player loses points. Conversely, when the second player scores a hit against the first player, the second player wins points and the first player loses points in a zero sum tug-of-war display.

Figure 5:
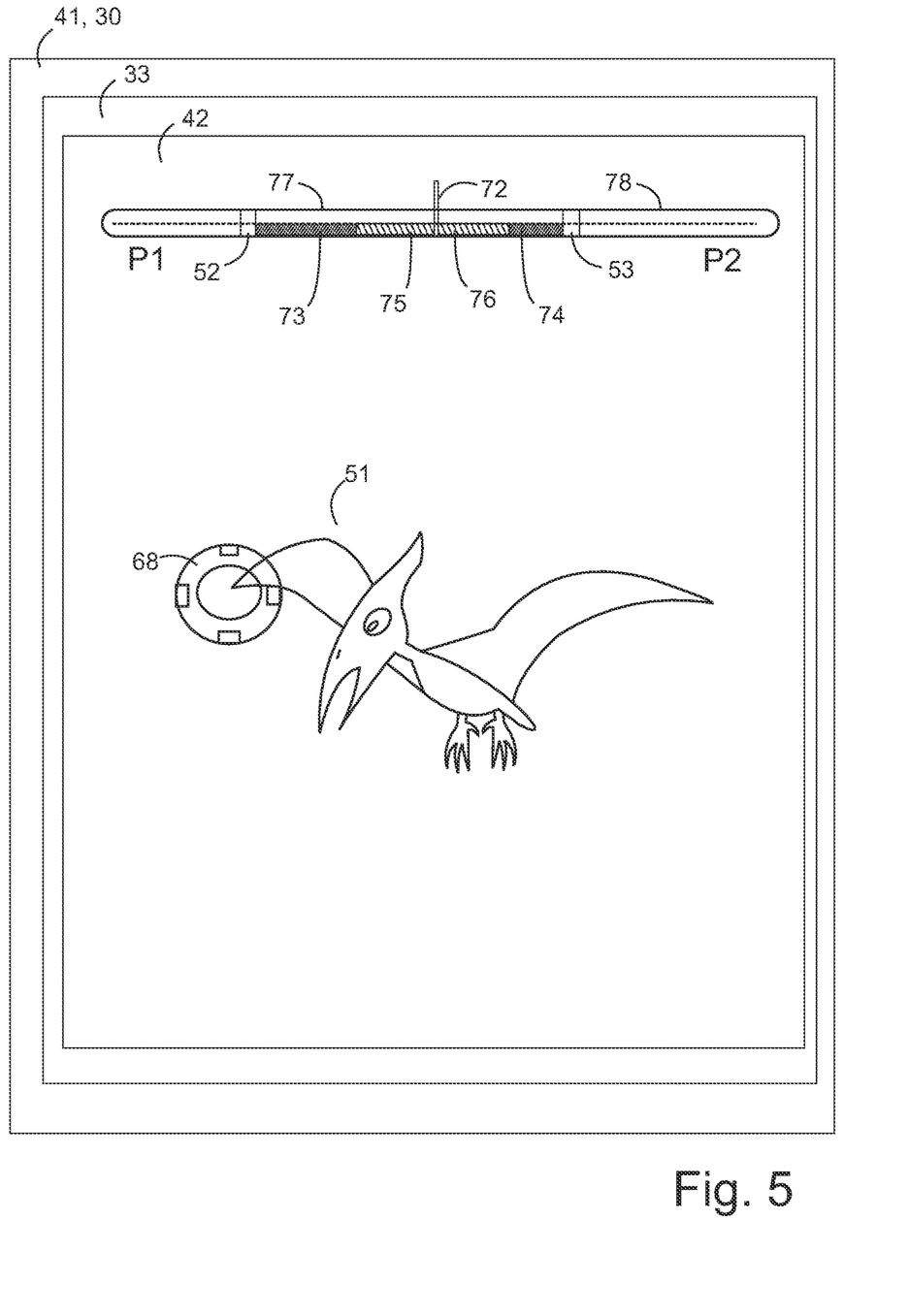
FIG. 5 shows more elements of a possible screen layout on a touchscreen.

As seen in FIG. 5, the processor is configured with a hit point system that provides certain incentives for improved play. The first player 25 has an incentive to jump in the bed middle 24 instead of the bed periphery 23. When the first player 25 jumps in the bed middle, the first player 25 has more hit points. A player begins with a set number of hit points, such as 100 hit points, and the hit points decay when the player suffers a hit, or when the player jumps to the bed periphery 23. The player may be automatically eliminated if the player leaves the trampoline bed altogether. If the player transitions from the bed middle 24 to the bed periphery 23, the player hit points may decay to 50 hit points for example until the player transitions back to the bed middle 24. Each hit could be worth 10 hit points.

The first player 25 can dodge the attacks by performing a pose for example. Particular poses or arm positions can correspond to avatar movement that allows dodging an attack by the second player. The first player 25 must pose over the bed middle 24 to be allowed the dodge.

As an alternative to the second player playing from a sedentary position, the second player could also be a trampoline player rather than a touchscreen player. The second player if a trampoline player can also have a set number of hit points such as 100 hit points. The second player can also suffer a decay of hit points if the second player jumps to the bed periphery 23. The bed middle 24 should be visible in the camera to identify that the second player is jumping over the bed middle 24.

The hit point decay for jumping away from the bed middle 24 can be adjusted. If one of the players is equal to or below 50 hit points, and the hit point decay is set for 50 hit points, that player is eliminated because the hit point decay brings the player to zero or negative points. The hit point decay is preferably proportional to the size of the bed middle 24.

Instead of accruing instantaneously, the hit point decay can accrue over time such as by 10 hit points per bounce for example. Thus, if a player is in the bed middle 24 and then bounces on the bed periphery 23, the player has a hit point decay can decrease the player's hit point by 10 so that the player only has 90 hit points. If the player bounces four more times, the player's hit points decrease down to 50. The player can recover the decayed hit points by jumping on the bed middle which can lead to a hit point recovery. For example, the player can have a hit point recovery of 10 for every bounce in the bed middle 24.

Players can be given incentives for jumping in the bed middle and disincentives for jumping away from the bed middle. The hit point decay and hit point recovery provides an improved game dynamic that rewards bounce stability and trampoline control. The hit points can have regeneration such as five hit points per two bounces for example. Regenerated hit points are different than recovered hit points because recovered hit points are only applicable to the hit points that are decayed from jumping away from the bed middle 24. Regenerated hit points can lengthen the game to allow longer gameplay. Regenerated hit points are hit points that are restored due to damage scored by the opposing player. To control the height of user bounces, the regenerated hit points can be awarded for bounces within a certain time with a time minimum and a time maximum. Thus, the user bounces being within a certain frequency on the bed middle 24 can trigger the regeneration. Preferably, the processor is configured to allow hit point regeneration only when the user is bouncing within a certain frequency on the bed middle 24. The bed middle 24 is preferably indicated by a round circle that is seen by the camera and partially covered by the user whenever a player lands on the circle. These hit points being added or subtracted are visually displayed on the hit point bar, which can be numerical display augmented or graphical only.

A variety of different bounce sensors such as vibration sensors can be implemented for detecting a bounce. The bounce sensors can be used in conjunction with the video sensors to provide more accurate bounce detection. The bounce sensor can be mechanically coupled to the bounce mat such as by being connected to the frame or springs so as to detect vibration from the bounce mat. The bounce sensor can also be coupled directly to the bounce mat.

Preferably, a speaker 71 can notify the user with an audible sound effect when the user is gaining or losing it points due to recovery and decay, or damage and regeneration. For example, the decay and damage can have low tones and the recovery and regeneration can have high tones. The speaker can also provide a single tone for a given number of hit points changed, such as one tone for every five hit points for example. Speakers 71 can be mounted in the wireless device 41 or the player one target 30, or the beam emitter 26 for example.

Figure 4:
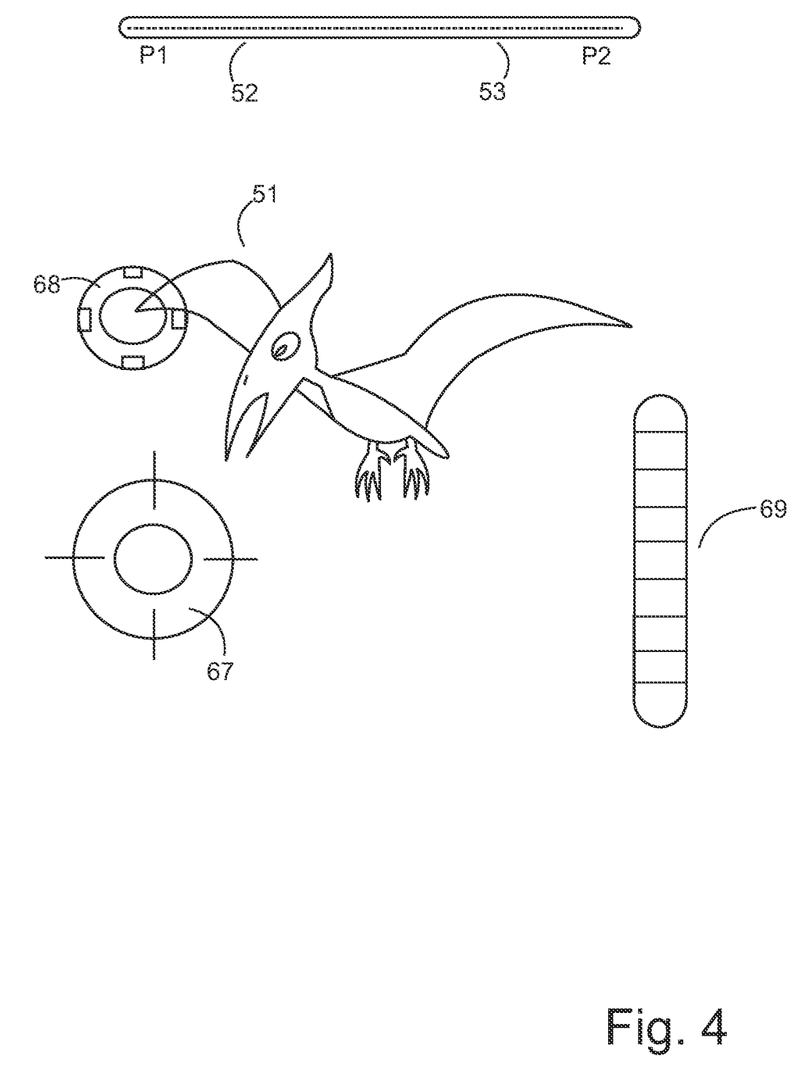
FIG. 4 shows elements of a possible screen layout on a touchscreen.

The wireless device 41 or the player one target 30 may have a processor 33. The processor 33 preferably includes a graphic processing unit for driving a touchscreen 42. The touchscreen may have a player one hitpoint indicator 52 and a player two hitpoint indicator. A starting hit point indicator 72 can be displayed to show the starting hit points of the first and second player. A first player decay indicator 73 and a second player decay indicator 74 can indicate decay due to bounding outside of the trampoline middle at the bed center 28. The first player decay indicator 73 is between the first player damage indicator 75 and the first player hit point indicator 52. The second player damage indicator 76 is between the starting hit point indicator 72 and the second player decay indicator. The first player hit point bar 77 drops and progresses to the left while the second player hit point bar 78 drops and progresses to the right.

Because the damage indicator is closer to the starting hit point indicator, the damage indicator is displayed as a bar which shows the amount of hit points lost due to damage. The decay indicator is preferably shown in a bar next to the damage indicator to show the amount of decayed hit points that can be recovered by returning to the bed middle. Jumping on the bed center 28 which can be marked as a point or a dot on the jump mat can optionally regenerate hit points at a slower rate than recovery of decayed hit points.

The invention claimed is:
1. A trampoline video game comprising:
   a. a trampoline having a bed suspended across a trampoline frame, wherein the bed has a bed center, a bed middle, and a bed periphery;
   b. a beam emitter configured for operation by a first player, wherein the beam emitter is configured to emit a beam;
   c. a player one target, wherein the player one target includes a sensor and a camera, wherein the camera is mounted so that it has a view of the bed center, the bed middle and the bed periphery, wherein the player one target is connected to a wide area network;
   d. a processor, electrically connected to the camera, wherein the processor is configured to generate a geometric model from an image or a video of the first player;
   e. a second player terminal configured as a wireless device with a touchscreen, wherein the second player terminal is configured to connect to the wide area network;
   f. a first player avatar generated on the touchscreen, wherein the first player avatar is generated from the geometric model; and
   g. a hitbox defined on the first player avatar, wherein the touchscreen is configured to score hits on the first player avatar during play.

2. The trampoline video game of claim 1, further including a first player hit point bar.

3. The trampoline video game of claim 1, further including a second player hit point bar.

4. The trampoline video game of claim 1, further including a coordinate space having a coordinate definition on the wireless device and displayed on the touchscreen, wherein the coordinate definition includes an X axis, a Y axis, and a Z-axis.

5. The trampoline video game of claim 1, further including a projectile defined on the coordinate space, wherein the hit box is defined in the coordinate definition, wherein the hit box has a hit box X coordinate centroid, a hit box Y coordinate centroid, and a hit box Z coordinate centroid.

6. The trampoline video game of claim 1, wherein the processor is configured to provide a first player starting hit point amount which is a first player's hit points when starting the game, wherein the first player loses hit points when the second player scores a hit on the first player.

7. The trampoline video game of claim 6, wherein the processor is configured to decay the first players hit points if the first player bounces away from the bed middle to the bed periphery by a hit point decay measured in units of hit points per bounce.

8. The trampoline video game of claim 7, wherein the processor is configured to have a first player hit point recovery that recovers the hit points decayed which is also measured in units of hit points per bounce.

9. The trampoline video game of claim 6, wherein the processor is configured to have regenerated hit points restored from damage scored by the second player when the first player bounces on the bed middle.

10. The trampoline video game of claim 1, further including a first player hit point bar; a second player hit point bar; a coordinate space having a coordinate definition on the wireless device and displayed on the touchscreen, wherein the coordinate definition includes an X axis, a Y axis, and the Z-axis; and further including a projectile defined on the coordinate space, wherein the hit box is defined in the coordinate definition, wherein the hit box has a hit box X coordinate centroid, a hit box Y coordinate centroid, and a hit box Z coordinate centroid.

11. The trampoline video game of claim 10, wherein the processor is configured to provide a first player starting hit point amount which is a first player's hit points when starting the game, wherein the first player loses hit points when the second player scores a hit on the first player.

12. The trampoline video game of claim 11, wherein the processor is configured to decay the first players hit points if the first player bounces away from the bed middle to the bed periphery by a hit point decay measured in units of hit points per bounce.

13. The trampoline video game of claim 12, wherein the processor is configured to have a first player hit point recovery that recovers the hit points decayed which is also measured in units of hit points per bounce.

14. The trampoline video game of claim 13, wherein the processor is configured to have regenerated hit points restored from damage scored by the second player when the first player bounces on the bed middle.

15. The trampoline video game of claim 10, further including a bounce sensor mechanically coupled to the bounce mat to detect vibration from a user bounce.

16. The trampoline video game of claim 10, wherein the player one target is mounted on a trampoline pole above the bed middle, wherein the camera is downwardly facing at an angle, wherein the bed middle is defined as a circular region on the trampoline, wherein the bed periphery is defined as a ring shaped region around the bed middle.

17. The trampoline video game of claim 10, further including a first player damage indicator and a first player decay indicator on the first player hit point bar, and further including a second player damage indicator and a second player decay indicator on the second player hit point bar.

18. The trampoline video game of claim 17, wherein the first player decay indicator increases when the first player jumps away from the bed middle.

19. The trampoline video game of claim 17, wherein the first player can regenerate hit points by jumping on the bed middle.

* * * * *